INVENTOR.
MATTHEW N. MILLER
BY
ATTORNEYS

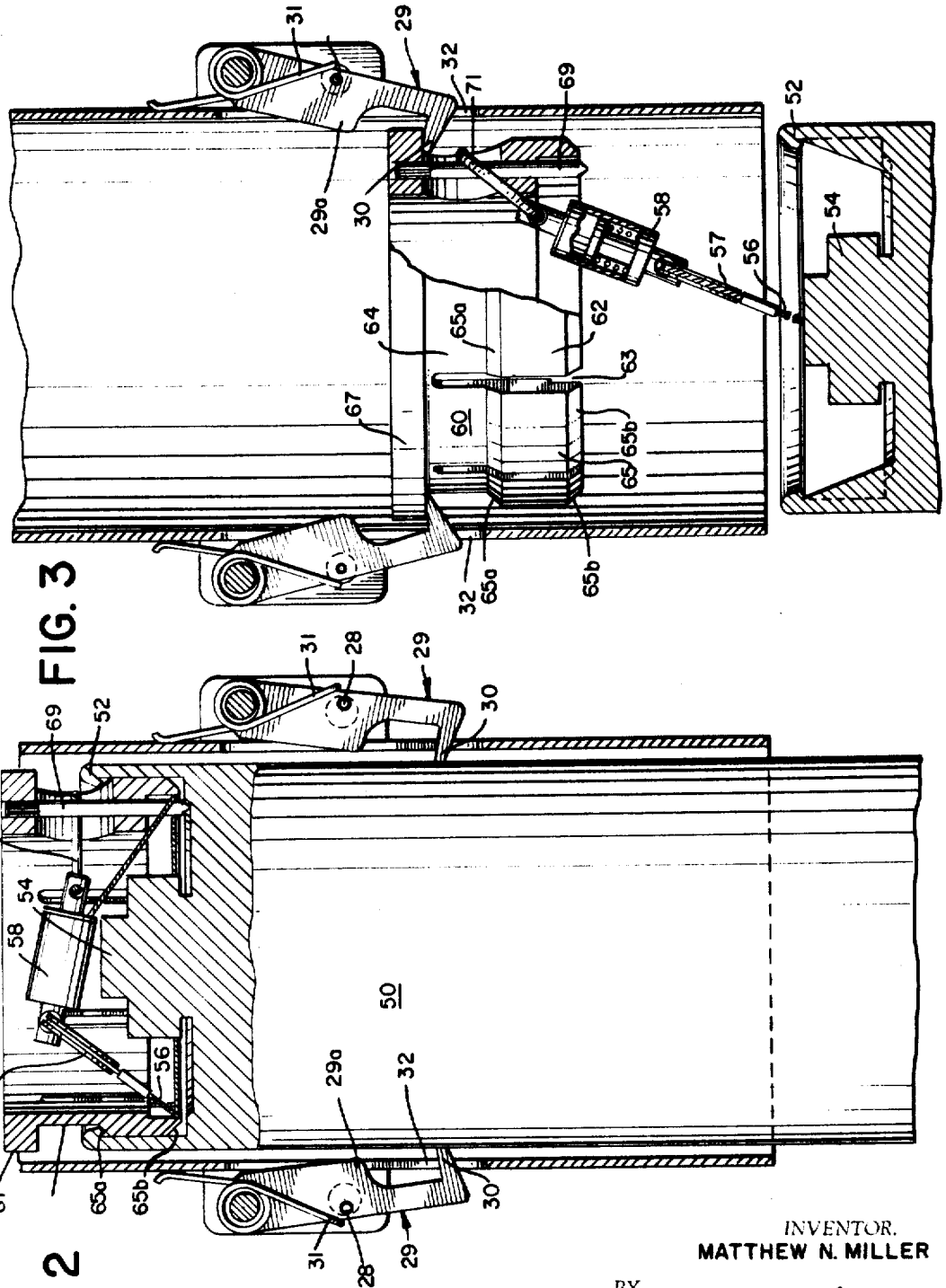

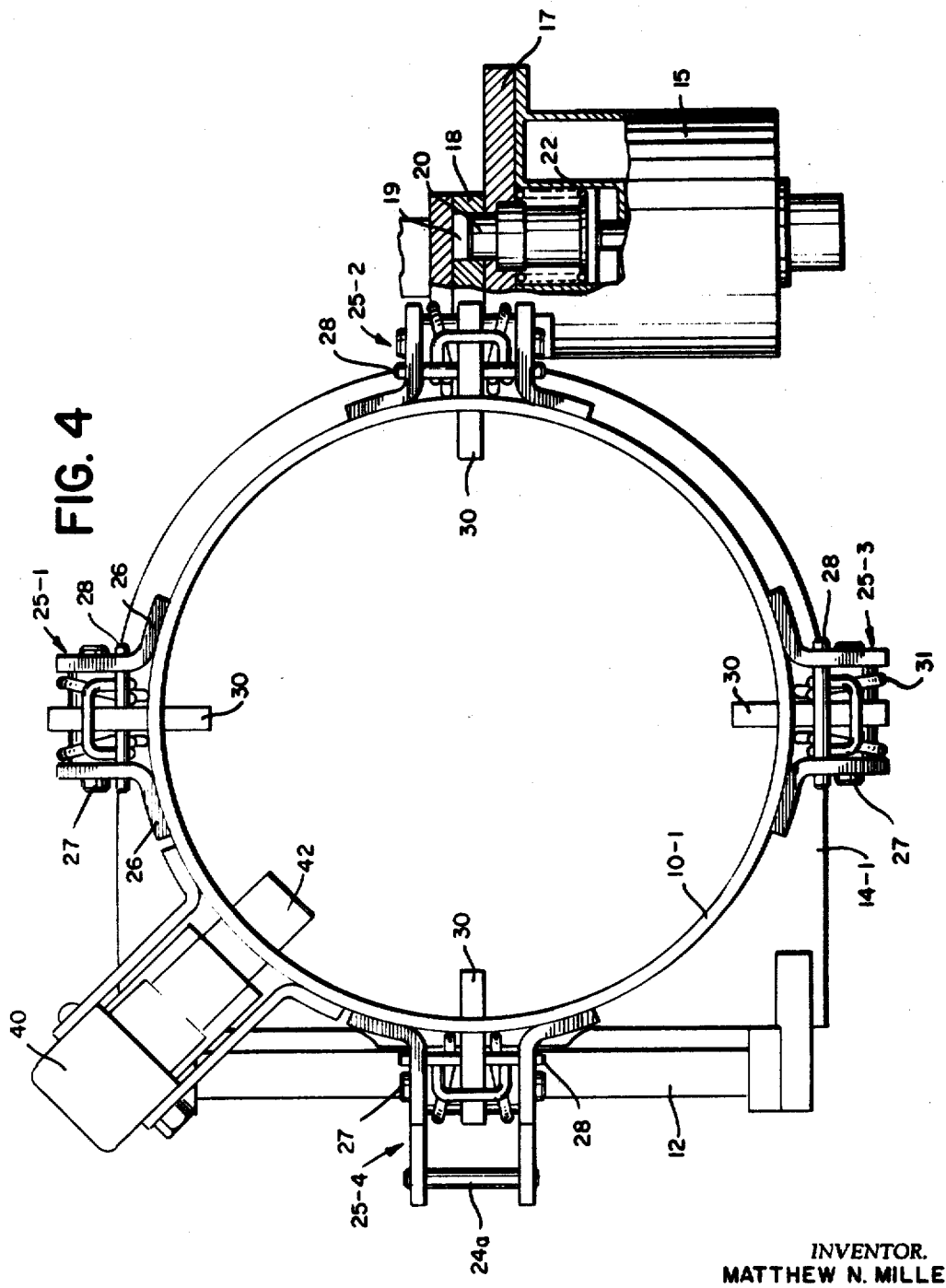

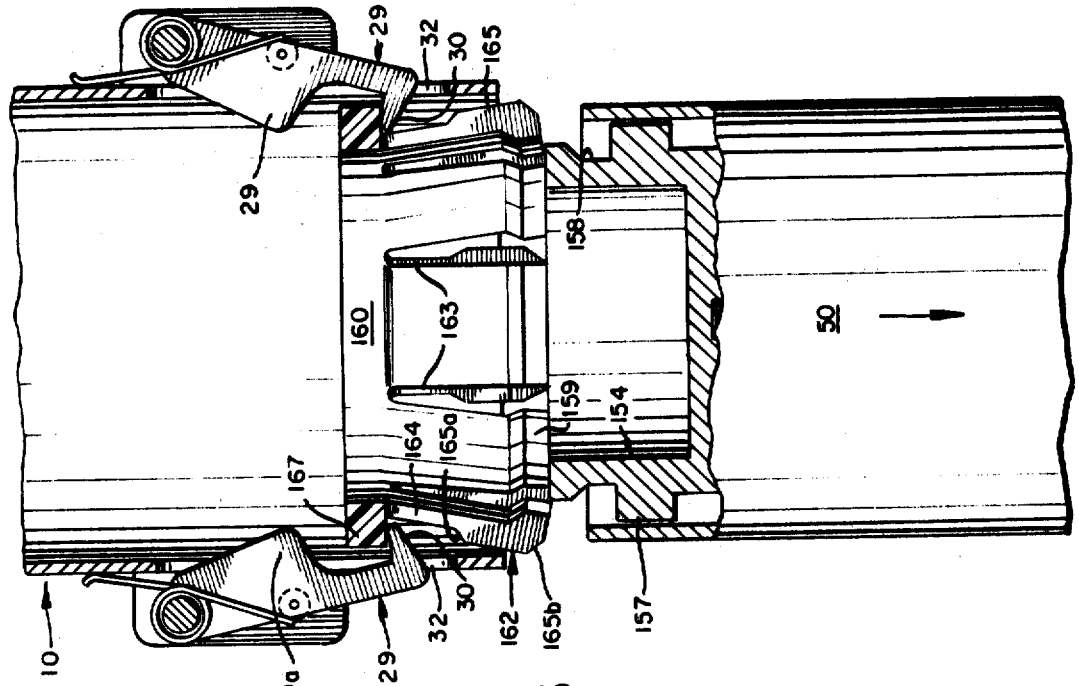
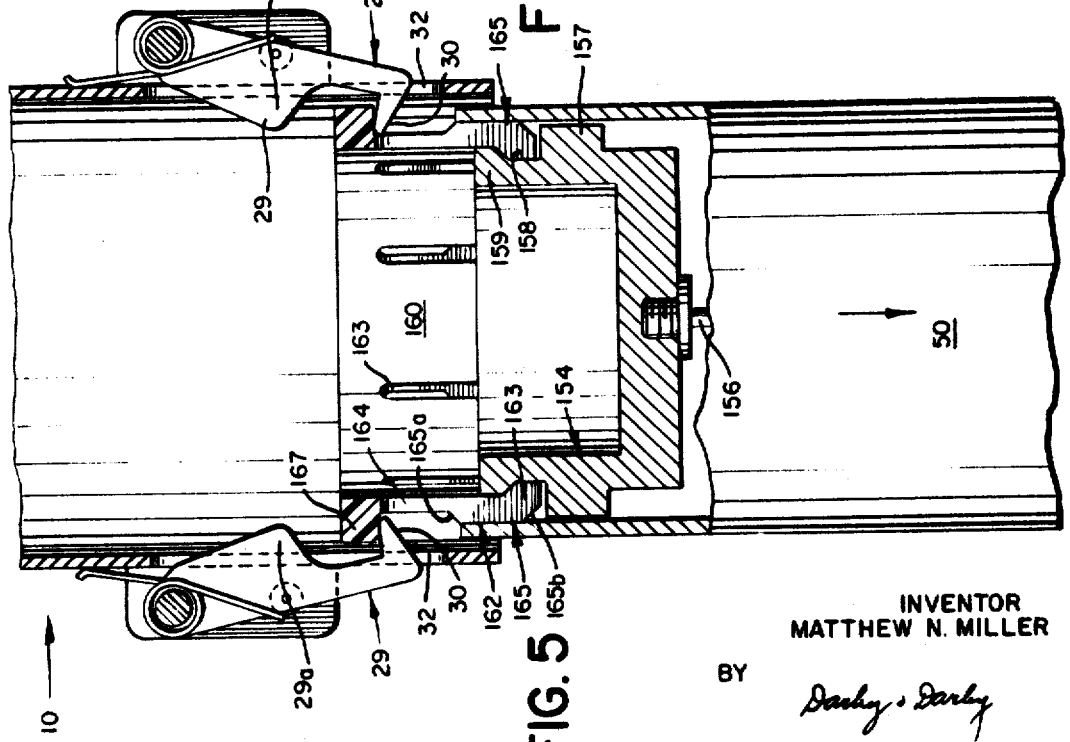

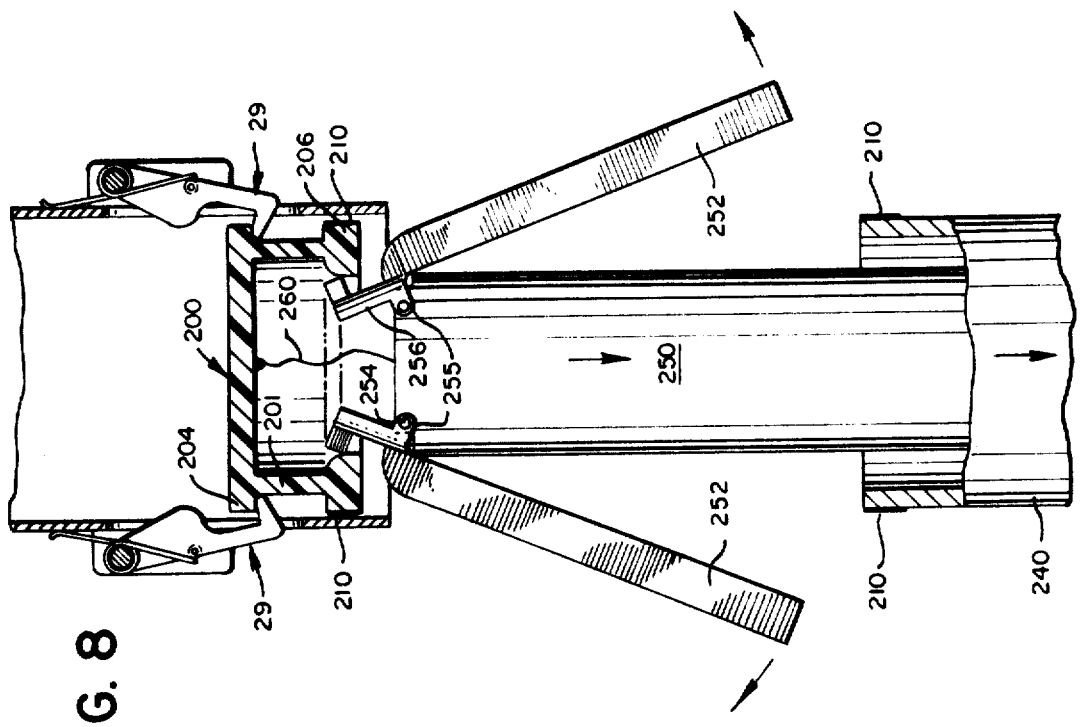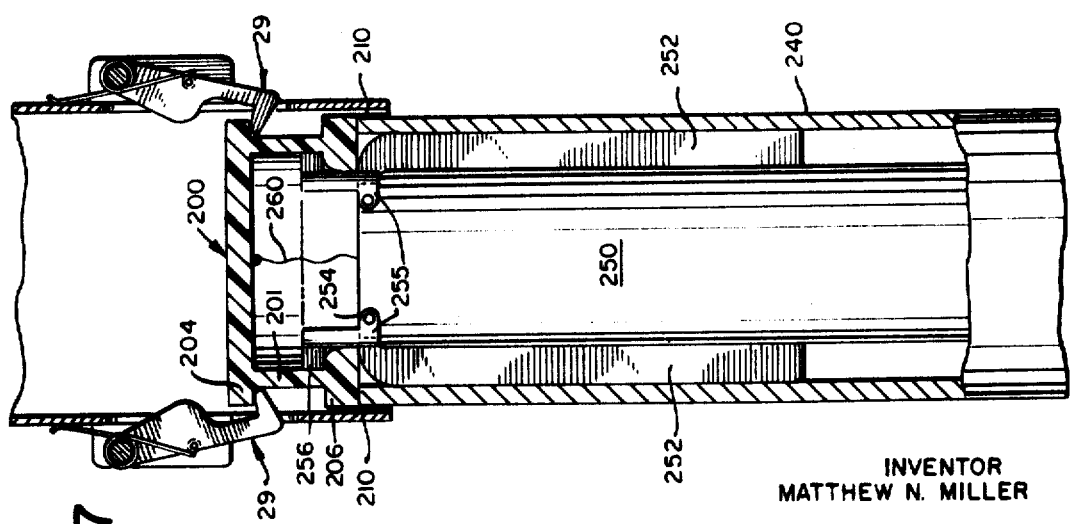

United States Patent Office 3,435,725
Patented Apr. 1, 1969

3,435,725
STORE LAUNCHING SYSTEM
Matthew N. Miller, Topanga, Calif., assignor to Fairchild Hiller Corporation, Bay Shore, N.Y., a corporation of New York
Continuation-in-part of application Ser. No. 539,425, Apr. 1, 1966. This application Sept. 1, 1966, Ser. No. 585,996
Int. Cl. F41f 5/02
U.S. Cl. 89—1.5                                    13 Claims

ABSTRACT OF THE DISCLOSURE

A system for successively launching stores through a tube in which a detachable insert is held to the store. The launch tube includes fingers which engage the insert and hold it as the store leaves the tube. Stores may be successively launched through the same tube with each insert held until released by the next successive store to be launched.

---

This invention relates to a launching system for stores and more particularly to a system for arming a store in a safe manner as it is launched.

This application is a continuation-in-part of my copending application Ser. No. 539,425 filed Apr. 1, 1966, now abandoned, which is assigned to the same assignee.

There are many situations where it is necessary to launch stores, such as flares, through a tube in a moving vehicle such as an aircraft. These stores generally have to be armed before or as they leave the vehicle and the arming is usually accomplished by pulling a lanyard which actuates either an electromechanical, mechanical or chemical timing device in the store. In an aircraft application the timing device causes the store to perform its intended function after it has fallen a predetermined distance.

Several problems are present in prior art store launching systems. In many of such systems, an operator must clip the store's lanyard to a hook, or some other fixture, on the vehicle in preparation for firing. This necessitates the operator handling the lanyard which is undesirable, particularly when the operator is under pressure to rapidly launch a number of these devices at one time or in sequence. Further, in prior systems the lanyard must be long enough to dangle outside the vehicle in order to avoid arming the store while it is in its launching tube. This also is undesirable since, after a number of stores have been launched, there are a like number of lanyards dangling outside the vehicle. In an aircraft, for example, this might adversely affect its flight characteristics or present a safety hazard. Additionally, if the lanyard is left in the launching tube it interferes with the subsequent launching of other stores unless the operator clears the tube. This wastes considerable time. Where the stores are fed automatically to the launcher the lanyard hooking problem is difficult to solve. Further, in prior art systems the lanyard problem becomes annoying when launching stores from a pressurized airplane since an opening to the outside pressure must be provided for the lanyard to extend through.

The present invention is directed to a launching system which eliminates all of the aforesaid problems. In accordance with the invention, a novel detachable insert is provided at one end of the store and the store's lanyard is attached to the insert. The launching tube is formed with a mechanism for holding the insert as the store drops out of the launch tube. In one embodiment of the invention when the store has dropped a sufficient distance to tighten the lanyard as it pulls against the insert retained in the tube, the store is armed and a spring loaded disconnect separates the lanyard from the insert and permits the store to fall freely to perform its intended function. In another embodiment, the insert arms the store directly as it is pulled out of the store casing and no lanyard is needed. In still a third embodiment of the invention the insert controls the actuation of the vanes of a vane stabilized parachute which is deployed after the store leaves the launch tube. In all embodiments a second store launched from the same tube releases the insert holding mechanism and allows the previously retained insert to drop out. As the second store is launched it pushes the insert of the previous store out the launching tube while its own insert is held by the retaining mechanism to arm the second store.

The present invention permits a number of stores to be sequentially launched from the same tube in safe and expeditious manner. Where a lanyard is used, the insert retaining arrangement is preferably constructed so that the actuating lanyard is not pulled until the flare is outside of the aircraft. This is a highly desirable safety factor. Additionally, the operator does not have to hook the lanyard to a stationary fitting on the aircraft since the insert serves as the fitting and it is held in the tube when the store drops therethrough. In the other embodiment of the invention the same advantages are present and, in addition, the direct arming of the store by the insert eliminates a possible source of failure due to lanyard malfunction. Both embodiments permit rapid manual launching of stores and are also advantageous in mechanisms for automatically feeding stores to the launcher.

It is therefore an object of the present invention to provide a store launching system which obviates the need for fastening the store arming lanyard to a fixed point in a vehicle in which the system is used.

Another object is to provide a system for sequentially launching a plurality of stores from a single launching tube in a vehicle.

An additional object is to provide a store having an insert to which the lanyard is fastened, the insert being retained in the vehicle as the store leaves the launching tube.

Yet another object is to provide a store with a vane stabilized parachute in which the release of the vanes is controlled by the insert.

Still a further object is to provide a store launching system in which a detachable insert on the store is held by a retaining mechanism in the launch tube.

An additional object is to provide a store launching system in which a detachable insert on the store directly arms the store as it leaves the launch tube.

Other objects and adavntages of the present invention will become more apparent upon reference to the following specification and annexed drawings, in which:

FIGURE 2 shows, partially in section, a portion of a launcher tube with a store, in a position about to pass out of the tube;

FIGURE 3 shows the launcher tube of FIG. 2 with the store having left the tube and the lanyard being actuated by the insert held by the retaining mechanism;

FIGURE 4 is an end view of the launcher tube;

FIGURE 5 is an elevational view, partially broken away and partially in section, of another embodiment of the invention in which the insert is held by the launch tube fingers and the store is not yet armed;

FIGURE 6 is a view similar to FIG. 5 in which the store has dropped a distance to disengage the insert and arm the store;

FIGURE 7 is an elevational view partially broken away and partially in section of another embodiment of the invention for launching stores with vane stabilized parachutes; and FIGURE 8 is a view similar to FIG. 7 in which the store has dropped a distance sufficient to actuate the parachute vanes.

Figure 1:
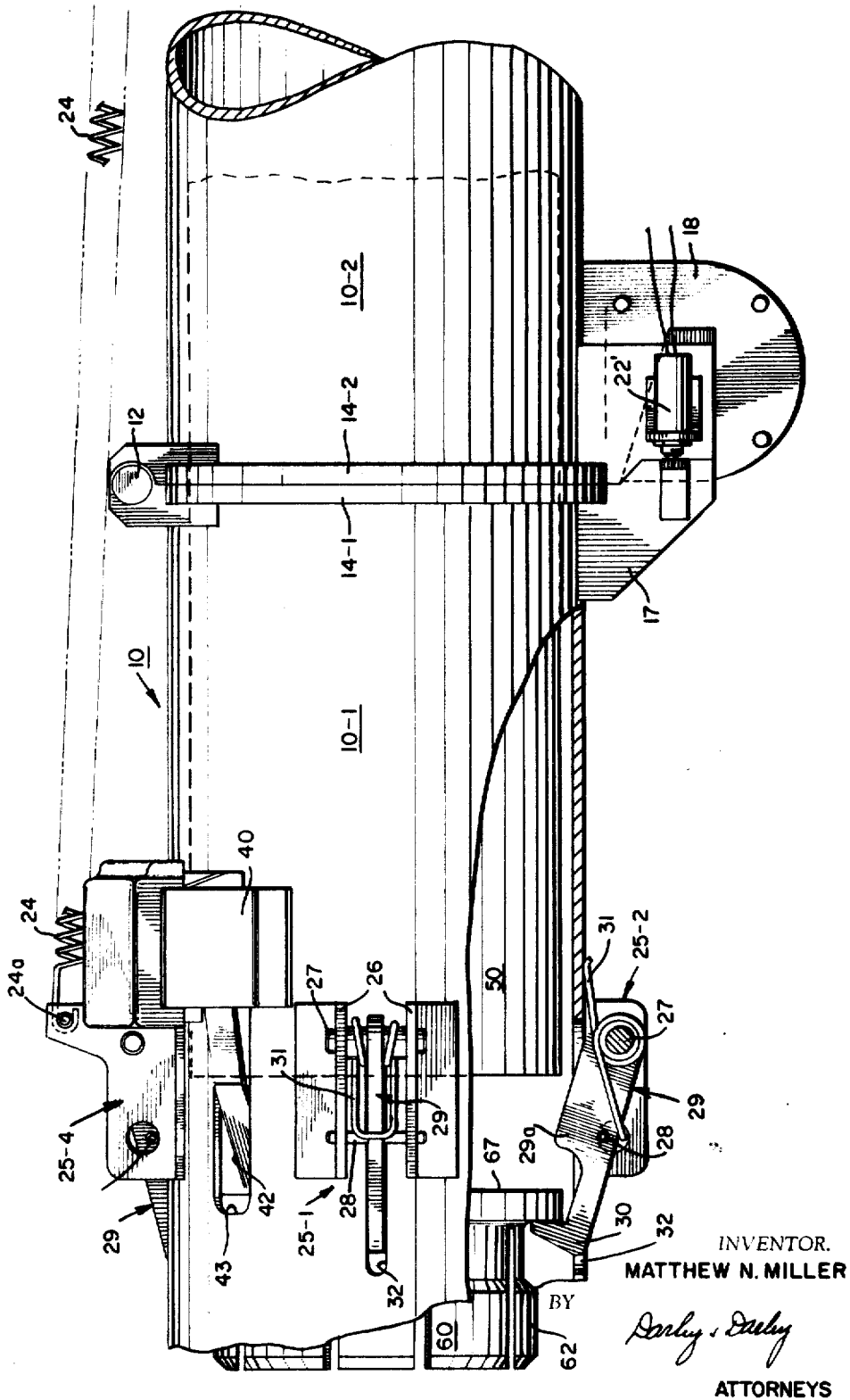
FIGURE 1 is an elevational view, partially broken away, of a portion of a launching tube with a store insert retained therein.

Referring to FIGS. 1–4, the launcher tube 10 of the launching system of the present invention is illustratively of generally cylindrical shape. It is preferably formed by upper and lower sections 10–1 and 10–2, so that the lower section 10–1 of the tube can be swung up when not in use to improve the aerodynamic characteristics of the vehicle. The two sections are connected together by a hinge 12 whose parts are fastened to respective flanges 14–1 and 14–2 on the launch tube sections. Sections 10–1 and 10–2 are held together by a tube locking solenoid 15 mounted on a bracket 17 secured to lower tube section 10–1. A latch bracket 18 is secured to upper tube section 10–1 and has a detent 19 into which a plunger 20 of solenoid 15 can extend when actuated to lock the two tube sections together. The plunger 20 is normally biased away from the detent by a spring 22.

The solenoid 15 can be remotely operated and, if desired, a switch 22 is mounted on latch bracket 18 to be actuated by an upstanding tab 23 on bracket 18 to provide an indication at a remote location that the two tube sections are properly locked in position.

Launcher tube 10 has an insert retaining mechanism formed by a plurality of insert retainer members 25, illustratively shown as four members designated 25–1 through 25–4, located near the bottom of launcher tube section 10–1. Each of the retainer members 25 is of similar construction and includes a bracket 26 formed by two right-angle pieces mounted on the tube with a space therebetween. An arm 29 having finger 30 at the end thereof is mounted on a shaft 29 which is rotatably journalled in the two pieces of the bracket 26. A loop spring 31 passes over the top of each arm 29, around its shaft 27 and has its ends engaging the outer wall of the tube to bias the finger 30 of each arm 29 into the tube interior through a respective slot 32 in the tube wall. As seen in FIG. 1, an enlarged portion 29a of an arm 29 also extends into the tube interior when the arm is at its maximum downward position as biased by its respective spring. A pin 28 mounted on each arm 29 moves within opposite holes 32 on the bracket pieces to limit the upward and downward movement of each arm.

A spring 24 for folding the two tube sections 10–1 and 10–2 about the hinge 12 is also provided. One end of spring 24 is connected to a shaft 24a mounted on the bracket of retainer member 25–4. The other end (not shown) is connected either to upper tube section 10–2 or to a fixed point on the vehicle on which the tube is mounted. When solenoid 15 is de-energized and its plunger 20 freed from the batch detent 19, spring 24a automatically pivots tube section 10–1 up about hinge 12. The launch tube 10 can be constructed to be fully withdrawn within the interior of the vehicle on which it is mounted and then folded into its two sections. Alternatively, section 10–2 can be fixedly mounted to the vehicle and section 10–1 extended when the tube is to be used. Further, the tube can be mounted in a horizontal or vertical position and also rotated in a horizontal or vertical plane. In a typical application, the tube is mounted substantially completely within an aircraft with its lower end near or protruding slightly beyond the aircraft skin line. This preserves the aerodynamic characteristics of the aircraft.

An electric jam sensing switch 40 is located adjacent retainer member 25–4. Switch 40 has a spring finger 42 extending through a slot 43 into the interior of tube section 10–1. The purpose of switch 40 is described below.

As shown most clearly in FIGURES 2 and 3, each store 50 used in the launching system of the present invention is provided with a continuous or sectioned lip 52 at its upper end. The shape of the store outer housing corresponds to the launch tube shape. Store 50 has any suitable conventional arming mechanism, a portion 54 of which is shown in general form. The particular arming mechanism used is conventional in the art and it, in itself, forms no part of the present invention. Therefore, no further description of it is given. One end of a lanyard 56 is connected to the arming mechanism and the other end of the lanyard is connected by a ring 57 to a conventional spring release mechanism 58.

In accordance with the invention each store 50 is provided with a detachable insert 60. Insert 60 is made of either plastic or metal and has a number of slots 63 in its circumference forming a number of flexible arms 62. A raised shoulder 65 is formed at the end of each arm 62 with chamfered upper and lower edges 65a and 65b. The chamfered upper edge 65a of the shoulders of the arms are engaged by the lip 52 on the store to hold the insert to the store by the force of the resilient arms 62 which are designed to provide sufficient holding force for a particular weight store and/or desired amount of lanyard pull.

Each arm 62 of insert 60 has a reduced diameter section 64 above its shoulder. The arms extend from a continuous flange 67 of an enlarged diameter which is somewhat less than the inner diameter of tube 10. A retaining pin 69 is mounted between the flange 67 and one of the arms 62 transverse to the insert diameter. A ring 71 connected to the spring release mechanism 58 is positioned over retaining pin 69.

The operation of the launching system of the present invention is as follows: Referring to FIGURE 2, a first store 50 is placed in the upper end of launcher tube 10. The body of the store engages the enlarged portion 29a of the retaining arms 29 as it drops and moves these arms outwardly against the bias of their respective springs 31 so that the fingers 30 clear the outer casing of the store. This prevents the fingers 30 from being broken or worn out. As the store 50 moves further in the tube due to gravity or an external launching force, the enlarged portion 29a of arms 29 ride over the store body and insert flange 67 until they clear the flange. At this point members 29 move inwardly permitting fingers 30 to fall into the reduced diameter insert section 64 and lock onto the insert 60 at the underside of its flange 67. With the insert now held, the weight of the store 50 moves arms 62 of the insert inwardly and the edges 65a of chamfered shoulder 65 slide under the lip 52. At this point the insert 60 begins to separate from the store body. Further downward movement of the store forces arms 62 inwardly so that the store lip 52 rides over the entire shoulder 65 of the arms 62. As the lower chamfered edges 65b ride under the store lip the insert is fully separated from the store and is held in the tube by the retainer members 25 grapsing flange 67.

As seen in FIG. 3, as the store 50 drops out of the tube, with its insert still held therein, the lanyard 56 begins to extend between the arming device 54 and the insert lanyard retaining pin 69. When the lanyard reaches its full extension, the arming mechanism 54 of the store is set into operation by the weight of the store pulling on the fixed lanyard. The spring disconnect mechanism 58 operates after the store is armed and aids in separating the lanyard from the store. At this time the store 54 is completely out of and detached from the aircraft and proceeds to perform its function. It should be understood that the length of the lanyard is preferably selected so that the store is armed only after it is completely beyond the skin line of the aircraft.

After the first store has been launched, only its insert 60 and the lanyard 56 fastened thereto are left in the launching tube. As the next store is launched from the tube its body contacts the extending portion 29a of the corresponding arms causing them to move outwardly. This outward movement is limited by pin 28 in holes 32 but it is sufficient so that the fingers 30 of retainer arms 29 can move away from the flange of the insert 60 left in the tube to permit it to fall out of the tube. The weight of the store being launched pushes the insert of the preceding store out of the tube.

The second store is launched in the same manner as the preceding store, namely, after its body has passed by the retaining members the fingers 30 catch the flange 67 of its insert 60 to hold the insert in the tube and actuate the arming device through the lanyard. Additional stores are launched in sequence in the same manner.

As seen in FIGURE 1, the finger 42 of jam sensing switch 40 is located at a position slightly above the retaining flange 67 of an insert held in the tube after a normal launch. If the launching tube is operating properly, spring finger 42 remains in the position shown and switch 40 is not actuated. If a store jams, so that either its body or its insert contacts finger 42, then a suitable circuit is actuated to inform the operator of this condition. The operator can then clear the tube manually. The jam sensing switch 40, for example, can operate a delay relay circuit so that a jam indicator is operated only after a predetermined time. This prevents normal passage of stores past the switch from giving a false indication of a jam.

FIGS. 5 and 6 show another embodiment of the invention in which a lanyard is not needed. Similar elements are given the same reference numerals as used previously. Here, the store arming device 154 is longitudinally movable within the store casing and has a pin 156 fastened to its bottom. The pin is connected to a suitable fuse (not shown) which, is not activated when the store is in the position shown on FIG. 5. The arming device 154 is formed with a shoulder 157 of the same general shape as the launch tube interior which serves as a bearing for the device as it travels in the store casing. The device also has a flange 158 of smaller outer diameter than shoulder 157 located above a reduced diameter portion 158.

The insert 160 of this embodiment has a number of spaced openings 163 forming a plurality of arms 162. The insert is made of a suitable plastic or metal material with the arms 162 having a considerable inherent resilient force to move outwardly. The lower portion of each arm 162 is formed with an inwardly extending hook or finger for grasping the arming device flange 159. A raised shoulder 165 with upper and lower chamfered portions 165a and 165b is formed on the outside of each arm. The upper end of the insert terminates in a flange 167 of slightly smaller diameter than the interior of the launch tube and a reduced diameter section 164 is located between the shoulder 165 and flange 167.

The operation of the embodiment of FIGS. 5 and 6 is as follows. The insert 160 is normally held within the store outer casing, as shown in FIG. 5, with the shoulders 165 of the arms wedged against the casing and the hooks 163 resting in the reduced diameter portion 158 of the arming device 154 grasping its flange 159. It should be noted that the interior of the upper end of the store is unobstructed. In this condition the store is not armed. The store drops down the launch tube 10, with the enlarged portions 29a of retaining members 29 riding on the store to keep fingers 30 out of contact, until the fingers 30 clear the top end of the store ride against the reduced diameter portion 164 of the insert and grasp the underside of the insert flange 167. After this occurs, continued downward movement of the store due to its weight causes the arming device 154 to be held in a fixed position by the holding force exerted on the insert by retainer fingers 30. The insert arms 162 still hold the flange 159 of the arming device since they are prevented from moving outwardly by the store casing. Thus, the store casing continues to drop as the arming device is held at a fixed point.

As the store continues to drop from the position shown in FIG. 5, the movement between the store casing and the arming device pulls pin 156 and arms the store. The store preferably is not armed until the upper end of i's casing has cleared the launch tube. The store continues its descent with its casing moving relative to the arming device 154 until the casing reaches the point where the arming device flange 159 starts to clear the casing's upper end. At this time the store is armed and insert arms 162 are no longer restrained by the store casing so they start to spring outwardly. Finally, the store moves to a point where the insert arms spring free of the casing. At this time the armed store is free to fall clear of the launch tube with its arming device 154 leaving the insert 160 held in the launch tube by retaining members 29.

The next store launched engages enlarged portions 29a of the retaining members pushing the fingers 30 outwardly so that the insert of the previous store can fall clear. The second and all successive stores are armed in the same manner previously described. It should be understood that the embodiment of FIGS. 5 and 6 does not require a lanyard and positive arming is ensured.

FIGS. 7 and 8 show another embodiment of the invention for launching stores with vane stabilized parachutes. Here, the insert 200, which also may be of a suitable plastic material, is formed with a continuous cylindrical wall 201 and upper and lower shoulders 204 and 206. The store has an outer case 240 and the insert 200 is held to the case upper end at the bottom of insert shoulder 206 by a number of strips 210 of bonding material, which may be for example paper, cardboard, metal foil, metal strips or plastic. The strips are preferably fastened to the case and insert by a suitable adhesive.

A parachute container 250 is positioned within the outer casing 240. A plurality of elongated vanes 252, which have a relatively small transverse dimension are mounted at the upper end of the container by a corresponding spring loaded pivot mechanism 254. Each pivot 254 has a clip 255 for mounting at spaced pivotal points on the case over a respective reduced diameter portion of the case upper end. A vane extends downwardly from a clip while a respective finger 256 for engaging the portion of the insert shoulder 206 lying inwardly of the insert wall 201 extends upwardly. The parachute container is held in case 240 by the fingers 256 and by any other suitable means (not shown) such as a mount at its bottom. Vanes 252 engage the inner wall of case 240. This stabilizes the parachute container 250 and restrains the vanes from moving outwardly.

A harness connects the bottom end of the parachute container 250 to the remainder of the store (not shown) lying below the parachute container. The harness also can be connected to an arming device similar to that shown in FIGS. 1–4.

The operation of the embodiment of the invention shown in FIGS. 7 and 8 is as follows. As the store drops down the launching tube the spring loaded fingers 29 clear the case 240 and grip the shoulder of the insert. The weight of the store below the insert is sufficient to break the bonding strips 210 so that the outer casing 240 continues to move downwardly with the insert still being held by the fingers 29. When the strips break the vanes 252 are still restrained by their engagement with the casing inner wall. After the casing drops a sufficient distance to clear the vanes, as shown in FIG. 8, there is no more restraint on the vanes and they are swung outwardly by pivot 254 to clear the lower end of the launch tube.

As the vanes swing outwardly their respective fingers 256 disengage from the inner portion of the insert shoulder 206 riding over the shoulder's rounded upper edge. The upper ends of the vanes are also rounded to facilitate the swinging action. When fingers 256 disengage from the insert the parachute container 250 is free to fall with the remainder of the store. It should be understood that there is a downward pull on the parachute container at this time through the harness attached to the other portion of the store. The entire store now falls clear of the launch tube and the parachute in container 250 is deployed by any suitable arrangement, for example, a barometric altimeter type of device on a disconnect type lanyard 260 attached to the upper wall.

When the store clears the launch tube only the insert 200 is left. The next store launched through the tube pushes the fingers 29 outwardly and clears the insert from the previous store from the tube. Launching of the second store is accomplished in the same manner as described above.

It should be obvious that the launching system of the present invention has many advantages. First of all, it permits rapid dropping of stores, limited only by the speed at which they can be loaded into the launcher tube. Also, when a lanyard actuated store is used and the retainer members are located near the skin line of an aircraft they insure that the lanyard is not pulled until the store is outside of the aircraft. This is a great safety feature where the store contains potentially dangerous material. Additionally, in a "half launch" condition, when the store does not leave the launching tube, the lanyard is not pulled, which is another safety feature. Similar advantages are obtained with the embodiment of FIGS. 5 and 8 since the store is not armed until it clears the skin line.

It should be understood that using the launch tube of the present invention that a mix of different types of stores, such as those shown in the various figures of the drawings, can be accomplished without any changeover of the launch tube. This is highly advantageous in tactical situations.

While certain presently preferred embodiments of the invention have been described, it is to be understood that the invention may be otherwise embodied and that the scope of protection is to be determined by the appended claims.

What is claimed is:

1. The combination comprising a store having an outer casing with a bent lip portion and an arming system including a lanyard which is to be pulled, an insert for said store, said insert including a central member having a plurality of radially resilient arms depending downwardly therefrom, a shoulder portion on at least two of said arms for engaging the lip portion of the store casing to hold the insert to the store, means on said insert to which the store lanyard is attached, and first means on said central member adapted to be engaged and held by an external means to hold said insert as the store moves so that the resilient arms of the insert with the shoulders thereon move radially of the bent lip of the casing to separate the insert from the store with the lanyard of the store extending between the held insert and the moving store to arm the store.

2. The combination of claim 1 wherein said first means comprises a flange extending radially outward of said central member and the resilient arms of the insert.

3. The combination of claim 1 wherein the bent lip portion of said store casing extends inwardly and the shoulders on the resilient arms of the store extend outwardly on the surface of the arms to engage the casing lip with at least a portion of the arms of the insert being located within the store casing, whereby the radially resilient arms of the insert move outwardly as the insert is separated from the store.

4. The combination of claim 3 wherein the raised shoulder on an insert arm also has an inwardly tapered lower edge over which the bent lip portion of the store casing rides as the store moves relative to the insert.

5. A system for successively launching stores comprising: a store having an outer casing; an insert member having radially resilient means with means thereon for engaging and holding the insert to a portion of the store; a launcher, a plurality of holding members each having a camming portion and a gripping portion, means for urging said holding members to extend within the launcher so that the gripping portion of each holding member will be in a position to engage and hold the insert member of a store to separate the insert from the store by the movement of the radially resilient means as the store passes through the launcher, the casing of the next successively launched store engaging the camming portions of the holding members to move said holding members to initiate clearance of the gripping portions of the holding members from the insert of the preceding store before the insert of the preceding store is engaged by the casing of the next successive store.

6. The launching system of claim 5 wherein the insert member having radially resilient means comprises a central member having a plurality of arms dependent downwardly therefrom and said store casing has an inwardly turned lip, means on said arms for engaging the store lip to hold said insert to the store.

7. The launching system of claim 5 wherein said store has an arming means and said insert has a central member with a plurality of downwardly extending resilient arms for engaging said arming means.

8. The launching system of claim 5 further comprising means extending within said tube for sensing improper detachment of an insert.

9. The launcher system of claim 5 wherein the store has an outer casing with a bent lip portion and an arming system including a lanyard which is to be pulled, said insert including a central member having a plurality of radially resilient arms depending downwardly therefrom, a shoulder portion on at least two of said arms for engaging the lip portion of the store casing to hold the insert to the store, means on said insert to which the store lanyard is attached, and first means on said central member adapted to be engaged and held by the gripping portions of said holding members to hold said insert as the store moves so that the resilient arms of the insert with the shoulders thereon moves radially of the bent lip of the casing to separate the insert from the store with the lanyard of the store extending between the held insert and the moving store to arm the store.

10. The combination of claim 9 wherein said first means comprises a flange extending radially outward of said central member and the resilient arms of the insert.

11. The combination of claim 9 wherein the bent lip portion of said store casing extends inwardly and the shoulders on the resilient arms of the store extend outwardly on the surface of the arms to engage the casing lip with at least a portion of the arms of the insert being located within the store casing, whereby the radially resilient arms of the insert move outwardly as the insert is separated from the store.

12. The combination comprising a store having an outer wall, a detachable insert located at one end of said store, means for holding said insert to said store until they are separated by further movement of the store upon the insert being held to a fixed point, a vane member, means for pivotally mounting said vane member to another portion of the store which is movable axially relative to said store outer wall, said vane member being restrained from pivoting by the interior of said outer wall, means mounting said vane with respect to said outer wall for permitting the outer wall to move with respect to the vane as the insert is held to the fixed point, and means on said vane engaging said insert to pivot said vane outwardly as said store outer wall separates from the detachable insert and the store outer wall clears said vane.

13. The combination of claim 12 wherein said vane has means engaging the insert which clears the insert and completely separates the store from the insert as the vane pivots outwardly.

References Cited

UNITED STATES PATENTS

| | | | |
|---|---|---|---|
| 1,385,598 | 7/1921 | Weed | 89—1.5 |
| 2,044,819 | 6/1936 | Taylor | 102—4 |
| 2,912,901 | 11/1959 | Kroeger et al. | 89—1 |

FOREIGN PATENTS

| | | |
|---|---|---|
| 302,933 | 11/1932 | Italy. |
| 634,394 | 11/1927 | France. |

SAMUEL W. ENGLE, *Primary Examiner.*

U.S. Cl. X.R.

102—4